US006264896B1

(12) United States Patent
Zhang et al.

(10) Patent No.: US 6,264,896 B1
(45) **Date of Patent: *Jul. 24, 2001**

(54) OXYGEN GENERATING COMPOSITIONS

(75) Inventors: Yunchang Zhang; James C. Cannon, both of Overland Park, KS (US)

(73) Assignee: Be Intellectual Property, Inc., Wellington, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/652,592

(22) Filed: Aug. 30, 2000

Related U.S. Application Data

(63) Continuation of application No. 09/240,562, filed on Jan. 29, 1999, now Pat. No. 6,126,854, which is a continuation of application No. 08/648,293, filed on May 15, 1996, now Pat. No. 5,882,545.

(51) Int. Cl.[7] ............................ A62B 7/08; A62B 21/00; C01B 11/14; C01B 11/18

(52) U.S. Cl. .................. 422/126; 252/187.1; 252/187.31

(58) Field of Search ............................ 252/187.31, 187.1; 422/126; 149/77, 108.2, 119, 113

(56) References Cited

U.S. PATENT DOCUMENTS 3,293,187 12/1966 Markowitz .
3,715,131 2/1973 Hurley et al. .
3,725,156 4/1973 Thompson .
3,736,104 5/1973 Churchill et al. .
3,748,199 7/1973 Vriesen et al. .
3,797,854 3/1974 Poole et al. .
3,856,590 12/1974 Kincaid et al. .
3,955,931 5/1976 Thompson .
4,073,741 2/1978 Heintz .
4,099,376 7/1978 Japs .
4,692,269 9/1987 Kmiec et al. .
5,049,306 9/1991 Greer .
5,089,069 2/1992 Ramaswamy et al. .
5,198,147 3/1993 Zhang et al. .
5,279,761 1/1994 Zhang et al. .
5,298,187 3/1994 Zhang et al. .
5,338,516 8/1994 Zhang et al. .
5,783,105 * 7/1998 Zhang et al. .................... 252/187.31
5,882,545 * 3/1999 Zhang et al. .................... 252/187.31
6,030,583 * 2/2000 Kshirsagar et al. ................. 422/126
6,126,854 * 10/2000 Zhang et al. .................... 252/187.31

FOREIGN PATENT DOCUMENTS 1035248A 9/1989 (CN) .

OTHER PUBLICATIONS

Industrial & Engineering Chemistry Research, vol. 30, No. 4, Apr. 1, 1991, pp. 778–783, Entitled: Oxygen Evolution Form KC103 Catalyzed by Metal Oxides as Air Bag Inflators.

Chemical Abstracts, vol. 125, No. 16, Oct. 14, 1996.

Abstract No. 200051, V. Klyucharev et al. "Thermal Analysis of Binary Mixtures of Ca0, Ca02, Ca(0H)2 and Mg(0H)2 With Sodium and Potassium Perchlorates".

Puritan–Bennett Aero Systems Co.–Chemical Oxygen Generators for Aviation (1972).

* cited by examiner

*Primary Examiner*—Joseph D. Anthony
(74) *Attorney, Agent, or Firm*—Fulwider Patton Lee & Utecht, LLP

(57) ABSTRACT

The oxygen generation composition utilizes magnesium oxide to modify and smooth the oxygen generation rate, suppress chlorine formation, improve the rheology and uniformity of performance of an operating chemical oxygen candle, and to facilitate the mixing of the candle ingredients. The oxygen generation composition typically comprises a metal powder as a fuel; magnesium oxide; and an oxygen source selected from the group consisting of alkali metal chlorates, alkali metal perchlorates, and mixtures thereof. The composition can also include a transition metal oxide catalyst, and can include a binder.

3 Claims, 1 Drawing Sheet

12
14
16
18
10
20
22

OXYGEN GENERATING COMPOSITIONS

RELATED APPLICATIONS

This is a continuation of Ser. No. 09/240,562 filed Jan. 29, 1999, now U.S. Pat. No. 6,126,854 which is a continuation of Ser. No. 08/648,293 filed May 15, 1996, now U.S. Pat. No. 5,882,545.

BACKGROUND OF THE INVENTION

1. Field of the Invention

This invention relates generally to oxygen generating compositions, and more particularly concerns improved oxygen generation compositions containing magnesium oxide as an additive to modify and smooth the oxygen generation, suppress chlorine formation, and to facilitate mixing of the compositions.

2. Description of Related Art

Chemical oxygen generating compositions based upon the decomposition of alkali metal chlorates or perchlorates have long been used as an emergency source of breathable oxygen, such as in passenger aircraft, for example. Oxygen generating compositions utilizing alkali metal chlorates or perchlorates are disclosed in U.S. Pat. Nos. 5,198,147; 5,279,761; and 5,298,187; each of which are incorporated herein by reference.

A typical chemical oxygen generating candle may have several layers with different compositions and thus different reaction rates. Multiple layers are used in the candle instead of a single formula to help match the oxygen generation requirements, which vary with time as an airplane descends following a loss of cabin pressure. Different applications have different oxygen generation requirements. The candle typically has a generally cylindrical shape with a taper, with a recess at one end to hold an ignition pellet. The ignition pellet is typically ignited by firing a primer, and heat from the ignition pellet then ignites the reaction of, the candle body, generating oxygen.

An aircraft oxygen generator is commonly preprogrammed according to the descent profile of a given type of airplane, and must meet the minimum oxygen flow requirement at all times during a descent. However, oxygen gas formed inside a chemical oxygen generation core or candle must develop sufficient pressure to escape from the core. This effect can cause an uneven and erratic smooth flow of oxygen from an activated oxygen generation core. In order to meet minimum flow requirements despite such variations in oxygen flow from the core, excess weight of the chemical oxygen generating composition is commonly used. To minimize unnecessary weight, particularly in aircraft, it would be desirable to provide oxygen generating compositions that can facilitate the smooth flow of oxygen from an activated oxygen generation core.

Barium peroxide, lithium peroxide and calcium hydroxide have been used together with cobalt oxide as inhibitors to moderate the performance of sodium chlorate in oxygen generating compositions. However, barium peroxide is toxic, so that disposal of expended and scrap oxygen generators containing barium peroxide can be expensive. Lithium peroxide and calcium hydroxide are very strong inhibitors, so that only small quantities, such as a fraction of one percent in the oxygen generating compositions, for example, can be used, making it relatively difficult to uniformly distribute the inhibitors in the oxygen generating compositions. Lithium peroxide also tends to cake when it adsorbs moisture and carbon dioxide, making mixing even more difficult. For a formulation containing cobalt oxide as a catalyst and lithium peroxide or calcium hydroxide as an additive, a prolonged and thorough mixing is critical to reduce the variation within each lot, and from one lot to the next. Decomposition of calcium hydroxide also produces water which can be undesirable for some applications. Calcium hydroxide also has minimal catalytic activity when no other catalyst is present.

Since calcium hydroxide is a relatively strong inhibitor, in oxygen generating compositions formulated with cobalt oxide and calcium hydroxide, localized regions having a high cobalt oxide concentration and a low calcium hydroxide concentration occur due to imperfect mixing, and have a far higher decomposition rate than other localized regions with a low cobalt oxide and a high calcium hydroxide concentration. Lithium hydroxide and calcium hydroxide based formulations of oxygen generating compositions thus typically exhibit a relatively high variation of performance within and among lots, due to nonuniform distribution of the ingredients within the oxygen generating compositions. It would be desirable to provide an improved oxygen generating formulation in which a uniform distribution of ingredients is easier to achieve, which will produce a greater uniform performance, and which is easier to manufacture than conventional formulations. The present invention meets these needs.

SUMMARY OF THE INVENTION

Briefly, and in general terms, the present invention provides for an improved oxygen generation composition that produces a greater uniformity of performance, a smoother, more uniform rate of oxygen generation, and is easier to mix and manufacture than comparable chlorate/perchlorate oxygen generation compositions utilizing other conventional oxygen generating inhibitors. Magnesium oxide (MgO) is used to modify the reaction, smooth oxygen generation, suppress chlorine formation, improve the rheology of an operating chemical oxygen candle, and facilitate the mixing of the candle ingredients.

The invention accordingly provides for an oxygen generating composition for producing a breathable gas upon ignition of the composition, comprising a metal powder as a fuel; magnesium oxide as a chlorine remover and reaction rate modifier; and an oxygen source selected from the group consisting of alkali metal chlorates, alkali metal perchlorates, and mixtures thereof. The oxygen generating composition can also further comprise a transition metal oxide catalyst, and can optionally further include a binder. In one preferred embodiment, the oxygen generating composition can comprise an oxygen generating composition for producing a breathable gas upon ignition of the composition, comprising: about 0.5 –15% by weight of a metal powder as a fuel; from zero to about 15% by weight of a transition metal oxide catalyst; about 0.1–15% by weight magnesium oxide; from zero to about 5% of a binder; and the remainder of an oxygen source selected from the group consisting of alkali metal chlorates, alkali metal perchlorates, and mixtures thereof. In another preferred embodiment the oxygen generating composition can comprise about 1–10% by weight of iron powder as a fuel; about 0.1–15% by weight of a transition metal oxide catalyst; about 0.5–4% by weight of magnesium oxide as a chlorine remover and reaction rate modifier; about 1–5% of a binder; and the remainder of an oxygen source selected from the group consisting of alkali metal chlorates, alkali metal perchlorates, and mixtures thereof.

Magnesium oxide is a relatively weak inhibitor which inhibits the decomposition of sodium chlorate catalyzed by cobalt oxide, and thus can modify the reaction and smooth oxygen generation. However, in the absence of, or in a low concentration of cobalt oxide, magnesium oxide catalyzes the decomposition of sodium chlorate. Since magnesium oxide is a weaker inhibitor when used with cobalt oxide, and is a catalyst in the absence of or in a low concentration of cobalt oxide, any variation of performance due to non-uniform distribution of cobalt oxide and magnesium oxide is much reduced. Magnesium oxide is also an anticaking agent, has very good flow properties, and can facilitate mixing. Therefore, the step of mixing of formulations using magnesium oxide as an additive can be greatly simplified in comparison with the prolonged mixing required for conventional oxygen generating compositions.

These and other aspects and advantages of the invention will become apparent from the following detailed description, and the accompanying drawing, which illustrates by way of example the features of the invention.

DETAILED DESCRIPTION OF THE PREFERRED EMBODIMENTS

Figure 1:
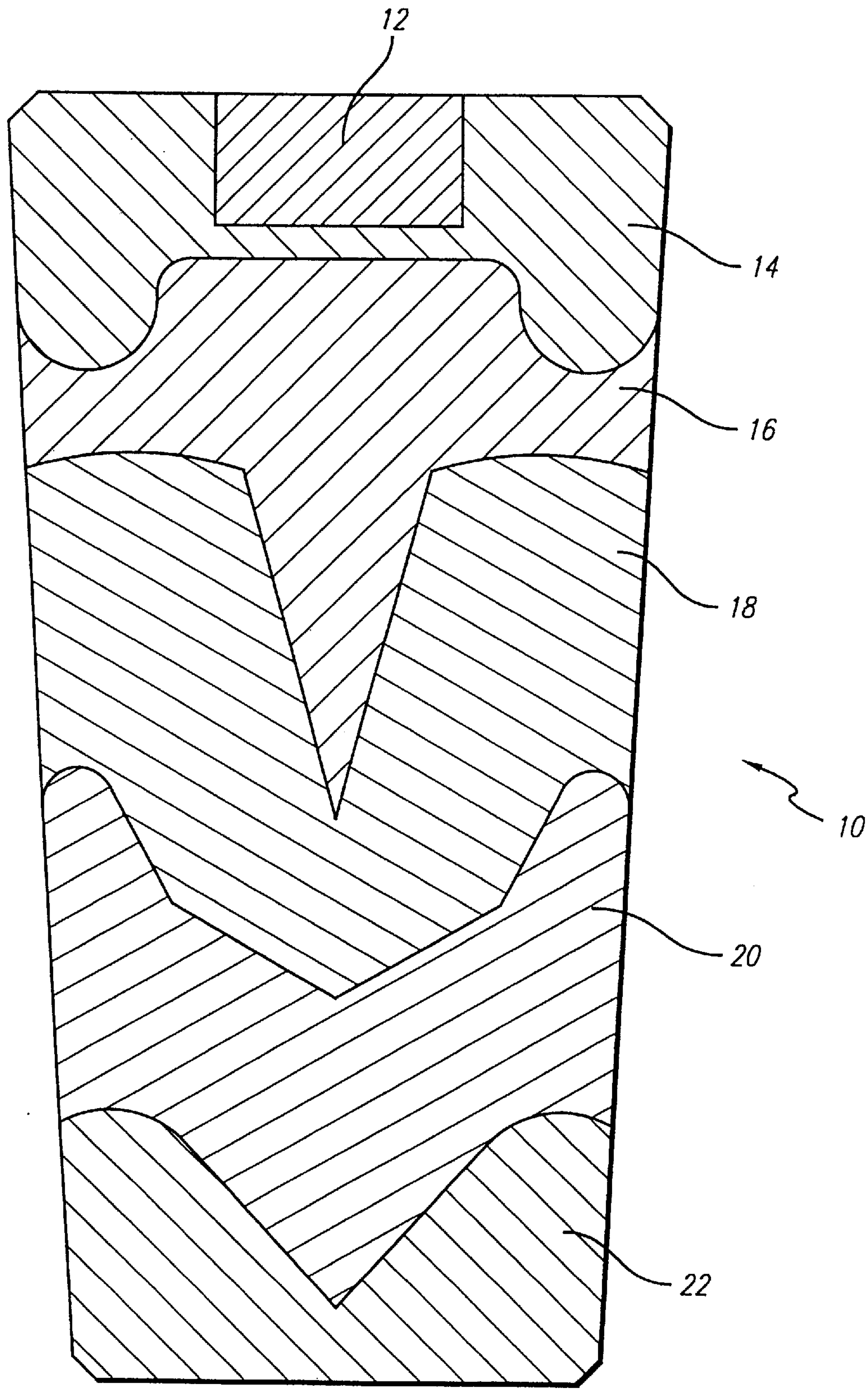
FIG. 1 is a cross sectional view of an oxygen generating candle formed from the oxygen generating composition according to the principles of the invention.

Flow of oxygen from an activated conventional oxygen generation core or candle can often be uneven and erratic. Formulations of oxygen generating compositions using lithium hydroxide and calcium hydroxide reaction rate inhibitors also typically exhibit a relatively high variation of performance within each lot and among different lots of the same formulation, due to non-uniform distribution of ingredients within the oxygen generating compositions.

The invention is accordingly embodied in an oxygen generating composition for producing a breathable gas upon ignition of the composition, which generally comprises a chlorate, a metal powder, a binder, and magnesium oxide. The new magnesium oxide additive is used to modify the reaction, smooth oxygen generation, suppress chlorine formation, improve the rheology of an operating chemical oxygen candle, and facilitate the mixing of the candle ingredients. The formulation may optionally include cobalt oxide and/or other catalysts.

The oxygen generating composition of the invention generally comprises about 0.5–15% by weight of a metal powder as a fuel. Preferred metal powders include iron, tin, manganese, cobalt, nickel, tungsten, titanium, magnesium, aluminum, niobium, zirconium, and mixtures thereof. In one presently preferred embodiment, iron powder having a high purity and a high surface area is used. Suitable iron powder may be obtained electrolytically or by hydrogen reduction to yield iron powder substantially free of carbon and other impurities which can produce toxic compounds upon operation of the oxygen generating candle. Use of iron powder in the oxygen generating candle furnishes heat and assists in stabilizing the chlorate decomposition.

In another preferred embodiment, tin powder having high purity and small particle size is used. Tin powder with particle size smaller than 325 mesh is preferred even though coarser tin powder also works in a satisfactory way. Tin powder is generally free of carbon. Therefore, when tin is used the contamination of carbon monoxide in the oxygen generated is minimized.

In a presently preferred embodiment, the oxygen generating composition further comprises about 0.1–15% by weight of a transition metal oxide catalyst. The transition metal oxide catalyst can, for example, be selected from the group consisting of oxides of cobalt such as CoO, $Co_3O_4$, $Co_2O_3$, and $CoO_x$, where x equals 1.0 to 1.5, nickel oxide, copper oxide, iron oxide, and mixtures thereof. The presently preferred transition metal oxide catalysts are cobalto-cobaltic oxide ($Co_3O_4$), nickel oxide and copper oxide.

There are advantages to using a reaction rate inhibitor when cobalt oxide is used, because cobalt oxide is so active that the decomposition reaction occurs in the solid phase. By reducing the catalytic activity, the reaction temperature can be raised slightly, so that the reaction occurs in a viscous molten phase. This permits smooth release of the oxygen gas generated through the decomposition of the chlorate or perchlorate.

In a currently preferred embodiment, the oxygen generating composition further includes from about 0.1 to about 5% by weight of magnesium oxide as a reaction rate inhibitor. In oxygen generating compositions formulated, for example, with cobalt oxide and calcium hydroxide, which acts as a relatively strong reaction inhibitor, localized regions having a high cobalt oxide concentration and a low calcium hydroxide concentration can occur due to imperfect mixing, and would have a far higher decomposition rate than localized regions with a low cobalt oxide and a high calcium hydroxide concentration. Magnesium oxide, on the other hand, is a relatively weak inhibitor which inhibits the decomposition of sodium chlorate catalyzed by cobalt oxide, and thus can modify the reaction and smooth oxygen generation. However, in the absence or low concentration of cobalt oxide, magnesium oxide catalyzes the decomposition of sodium chlorate. This is particularly advantageous for moderating the reaction rate of the oxygen generating composition. Since magnesium oxide is a weaker inhibitor when used with cobalt oxide, and is a catalyst in the absence of cobalt oxide, non-uniform mixing of the oxygen generating composition will not so adversely affect uniformity of performance of the oxygen generating composition, in comparison with prior conventional oxygen generating compositions.

Magnesium oxide is also advantageous in that it is very fluffy, so that it can also function as a thickening agent to help improve the molten rheology of a working oxygen generator. Sodium chlorate based oxygen candle compositions commonly have operating temperatures above the melting point of sodium chlorate, at about 265° C., so that the sodium chlorate in the oxygen generating composition can melt and form a paddle during operation of the oxygen generator. Proper operation of a chemical oxygen candle depends on the propagation of the reaction front along the longitudinal axis of the candle to release oxygen uniformly according to a predefined profile. Once a region within the candle melts and forms a paddle, the reaction can go in a much faster and irregular way. The performance of an oxygen candle can therefore be improved by improving its melt rheology. Since magnesium oxide is a moderately active catalyst in the absence of cobalt oxide, and is a weak inhibitor in the presence of cobalt oxide, the variation due to uneven distribution is much smaller when magnesium oxide is used in place of calcium hydroxide. Evidence of this benefit is the observation that the expended blocks of the oxygen generating composition including magnesium oxide generally have more uniform texture. Magnesium oxide also does not produce water like calcium hydroxide, and is therefore advantageous for an application that requires low moisture levels in the evolved oxygen.

Magnesium oxide is suitable as an additive in the oxygen generating composition of the invention as long as the material has a small particle size and a high surface area. Examples of suitable forms of magnesium oxide are the so-called light magnesium oxide available from Aldrich Chemical, and the high surface area magnesium oxide available from C. P. Hall under the commercial name "MAGLITE", although other forms of magnesium oxide may also be suitable. The light magnesium oxide from these two suppliers typically has a surface area of approximately 100 to 200 $m^2/g$. Even though magnesium oxide having a high surface area is preferred, magnesium with a lower surface area would also work in a similar manner, although with a slightly higher loading.

The oxygen generating compositions of the invention can also optionally further include up to about 5% of one or more binders. In a presently preferred embodiment, the binder can be an inorganic binder such as glass powder, glass fiber, fiberglass, ceramic fiber, steel wool, bentonite, kaolinite and mixtures thereof, for example, although other inorganic binders can also be suitable.

The remainder of the oxygen generating composition preferably comprises an oxygen source selected from the group consisting of alkali metal chlorates, alkali metal perchlorates, and mixtures thereof. The alkali metal chlorate can be sodium chlorate, potassium chlorate, or lithium chlorate, for example, and the alkali metal perchlorate can be potassium perchlorate, lithium perchlorate, or sodium perchlorate, for example, although other alkali metal chlorates and perchlorates may be suitable. The presently preferred chlorate is sodium chlorate, and the presently preferred perchlorate is potassium perchlorate. Sodium chlorate is presently preferred as an oxygen source because it has a relatively high oxygen yield per unit weight compared to potassium chlorate, and a reasonably low decomposition temperature compared to potassium chlorate and perchlorate and lithium perchlorate. Decomposition of sodium chlorate is exothermic once initiated, which permits a self-sustaining operation of an oxygen generating candle or core formed from the oxygen generating compositions of the invention. Sodium chlorate is also currently preferred as the oxygen source due to its currently relatively low price. In one presently preferred aspect of the invention, the oxygen source can alternatively be a combination of a major amount of sodium chlorate and a minor amount of potassium perchlorate.

In one presently preferred embodiment of the invention, the oxygen generating composition can comprise about 1–10% by weight of metal powder as a fuel; about 0.1–15% by weight of a transition metal oxide catalyst; about 0.5–4% by weight of magnesium oxide as a chlorine remover and reaction rate modifier; about 1–5% of a binder; and the remainder of an oxygen source selected from the group consisting of alkali metal chlorates, alkali metal perchlorates, and mixtures thereof.

In forming an oxygen generating core or candle, the metal powder, metal oxide catalyst, magnesium oxide, and the inorganic binder (if used) are premixed. The oxygen source chlorate/perchlorate component is typically separately mixed with approximately 1 to 5% water, by weight, which is used as a lubricant to facilitate the formation of the oxygen generating cores or candles. The premixed powder is then mixed with the wet chlorate/perchlorate. The chemical oxygen candles are formed by compaction of the damp mixture in a mold, and are then dried at about 120° C. to remove the water that was added during the mixing process. However, a small residue of water may remain in the oxygen generating composition even after drying.

With reference to FIG. 1, a typical chemical oxygen generating candle 10 commonly is composed of several layers, with each layer having a different formulation. The multiple layers with different formulations can thus be designed to match the desired oxygen generation rate, based upon specified requirements of the application, since different applications may have different oxygen generation rate requirements. While the oxygen generating candle shown in FIG. 1 has 5 layers, any number of layers can be used to form the oxygen generating candle. Iron powder and tin powder are currently preferably used as a fuel in one or more of the layers, depending upon the application. The various types of interface shapes between layers, shown in FIG. 1, are used to help control the transition of the reaction as it progresses from one layer to another. The interface shapes and relative sizes and reactivities of the layers can be modified, depending upon the requirements of the specific applications of the oxygen generating candles. Oxygen generation candles or cores are typically formed in a cylindrical shape with a taper. At the top of the candle there is a recess to hold an ignition pellet 12, which can be ignited by firing a percussion primer, for example. A typical ignition pellet can, for example, have a composition of about 35% by weight iron, 13–15% by weight cobalt oxide, about 5% iron oxide, about 3–4% by weight of a binder, and the balance sodium chlorate. The heat from the ignition pellet is then sufficient to initiate the decomposition of the layers 14, 16, 18, 20 and 22 of the oxygen generating candle to release oxygen.

The oxygen generating compositions of the invention are further illustrated in the following examples, in which percentages are by weight.

EXAMPLE 1

1st layer: 17 grams: 12.5% iron powder, 9% cobalt oxide, 4% glass powder, and 74.5% $NaClO_3$.

2nd layer: 58 grams: 6.7% iron powder, 1.45% cobalt oxide, 1% magnesium oxide, 2.5% glass powder, and 88.35% $NaClO_3$.

3rd layer: 80 grams: 5.5% iron powder, 0.55% cobalt oxide, 1% magnesium oxide, 2% glass powder, and 90.95% $NaClO_3$.

4th layer: 70 grams: 3.4% iron powder, 0.25% cobalt oxide, 1% magnesium oxide, 2% glass powder, and 93.35% $NaClO_3$.

5th layer: 145 grams: 2.3% iron powder, 0.18% cobalt oxide, 1% magnesium oxide, 2.5% glass powder, and 94.02% $NaClO_3$.

The powders for each layer were premixed without sodium chlorate, the sodium chlorate was mixed with a small amount of distilled water, and then the premixed powders were mixed with the wet sodium chlorate. Chemical oxygen candles were then formed by compaction of the damp mixtures in a mold. The candles were then dried at 120° C. to remove the water added.

A dried candle was then loaded into a stainless steel housing, ignited, and operated for 14.5minutes, generating approximately 111.3 liters of oxygen at room temperature. The reaction was uniform and the expended candle had a uniform texture. No magnesium oxide was used in the first layer, to insure a very high initial oxygen generation rate. Loading of magnesium oxide in the first layer would slightly reduce the initial oxygen generation rate, which would be suitable for some applications.

EXAMPLE 2

1st layer: 21.2 grams: 10.0% tin powder, 8.5% cobalt oxide, 4.0% glass powder, and 77.5% sodium chlorate.

2nd layer: 32.3 grams: 6.5% tin powder, 0.8% MgO, 1.0% cobalt oxide, 2.0% glass powder, and 89.7% sodium chlorate.

3rd layer: 83.5 grams: 5.5% tin powder, 0.5% MgO, 0.48% cobalt oxide, 2.0% glass powder, and 91.54% sodium chlorate.

4th layer: 98.3 grams: 5.0% tin powder, 0.5% MgO, 0.37% cobalt oxide, 2.0% glass powder, and 92.13% sodium chlorate.

5th layer: 378.8 grams: 4.0% tin powder, 0.5% MgO, 0.25% cobalt oxide, 2.0% glass powder, and 93.25% sodium chlorate.

The ingredients were mixed in the same way as stated in example 1. A candle was pressed, dried, loaded and tested in the same way as described in example 1. The candle operated 16.22 minutes and generated approximately 191.1 liters of oxygen.

It will be apparent from the foregoing that while particular forms of the invention have been illustrated and described, various modifications can be made without departing from the spirit and scope of the invention. For instance, although water was utilized in forming the compositions in the examples above, it would be possible to suitably compress dry mixtures to form chemical cores. Furthermore, although the cores as illustrated are typically cylindrical with a taper, molds could be constructed in many other configurations. Accordingly, it is not intended that the invention be limited, except as by the appended claims.

What is claimed is:

1. An improvement in an oxygen generating composition for producing a breathable oxygen gas for emergency use for sustaining life for several minutes upon ignition of the composition, the composition consisting essentially of a metal powder fuel, a transition metal oxide catalyst, a binder, and an oxygen source selected from the group consisting of alkali metal chlorates, alkali metal perchlorates, and mixtures thereof, said composition being capable of producing said breathable oxygen gas for a period of several minutes for sustaining life, the improvement comprising:

magnesium oxide as a reaction rate inhibitor.

2. The oxygen generating composition of claim 1 wherein said magnesium oxide has a surface area of approximately 100 to 200 $m^2/g$.

3. The oxygen generating composition of claim 1, wherein said magnesium oxide is approximately 0.1–5% by weight of the oxygen generating composition.

* * * * *